(12) United States Patent
Xu et al.

(10) Patent No.: US 8,608,064 B2
(45) Date of Patent: Dec. 17, 2013

(54) PAYMENT SYSTEM AND METHOD OF IC CARD AND A MULTI-APPLICATION IC CARD AS WELL AS A PAYMENT TERMINAL

(75) Inventors: Jinyao Xu, Shanghai (CN); Chunhuan Li, Shanghai (CN); Chunye Hui, Shanghai (CN); Jianning Bo, Shanghai (CN); Hongwen Meng, Shanghai (CN); Yanmei Zhou, Shanghai (CN); Denfeng Han, Shanghai (CN)

(73) Assignee: China Unionpay Co., Ltd., Pudong, Shanghai (CN)

( * ) Notice: Subject to any disclaimer, the term of this patent is extended or adjusted under 35 U.S.C. 154(b) by 0 days.

(21) Appl. No.: 13/511,997

(22) PCT Filed: Aug. 24, 2010

(86) PCT No.: PCT/CN2010/001279
§ 371 (c)(1),
(2), (4) Date: Sep. 17, 2012

(87) PCT Pub. No.: WO2011/063590
PCT Pub. Date: Jun. 3, 2011

(65) Prior Publication Data
US 2013/0001304 A1    Jan. 3, 2013

(30) Foreign Application Priority Data

Nov. 27, 2009    (CN) .......................... 2009 1 0199621

(51) Int. Cl.
*G06K 5/00* (2006.01)
(52) U.S. Cl.
USPC ............................ 235/380; 380/283; 380/281

(58) Field of Classification Search
USPC ............... 235/380; 705/50–79; 380/283, 232, 380/273, 277, 281, 241, 260, 284, 30
See application file for complete search history.

(56) References Cited

U.S. PATENT DOCUMENTS

| 6,128,391 A * | 10/2000 | Denno et al. .................. 380/283 |
| 2003/0097344 A1 * | 5/2003 | Chaum et al. ..................... 705/75 |

FOREIGN PATENT DOCUMENTS

| CN | 1509452 A | 6/2004 |
| CN | 1741074 A | 3/2006 |
| CN | 101087329 A | 12/2007 |
| EP | 0 940 785 A2 | 9/1999 |
| EP | 1 335 331 A2 | 8/2003 |
| JP | 2001-76080 A | 3/2001 |
| JP | 2001-076080 A | 3/2001 |

* cited by examiner

*Primary Examiner* — Thien M Le
*Assistant Examiner* — Asifa Habib
(74) *Attorney, Agent, or Firm* — Blakely Sokoloff Taylor & Zafman

(57) ABSTRACT

A payment system and method of IC card and a multi-application IC card as well as payment terminal are proposed in the present invention. The terminal and the IC card perform off-line data authentication using an asymmetric key algorithm during an off-line transaction, and if the transaction is not approved in manner of off-line, the terminal and the IC card performs an on-line transaction via a host. Therefore, the payment system and method of IC card and the multi-application IC card as well as payment terminal disclosed in the present invention can be used both in machinery without on-line transaction environment and in standard merchant machinery with on-line transaction environment.

19 Claims, 5 Drawing Sheets

PAYMENT SYSTEM AND METHOD OF IC CARD AND A MULTI-APPLICATION IC CARD AS WELL AS A PAYMENT TERMINAL

This is a non-provisional application claiming the benefit of International Application Number PCT/CN2010/001279, filed Aug. 24, 2010.

TECHNICAL FIELD

The present invention relates to a payment system and method and an IC card as well as a payment terminal, more particularly, to a off-line Payment System and Method of IC Card and a Multi-application IC Card as well as an off-line Payment Terminal.

BACKGROUND

Currently, along with the application of IC card being continuously increasing and becoming more and more popular, many applications are emerging, in which IC cards are used for small amount offline payment, such as an e-wallet system. The typical transaction process of said system is as follows: a terminal sends a initializing command to a card in order to initiate a transaction; the initializing command is processed by an IC card to check whether or not the key index number contained in the initializing command is supported and whether or not there is sufficient balance; a pseudo random number and a Procedure Key (SESPK) is then generated to verify the first Message Authorization code (MAC1) and send it to the terminal as a response; the first Message Authorization code (MAC1) is generated for the pseudo random number by a Secure Access Module (PSAM) of the terminal; Thereafter, the validity of the first Message Authorization code (MAC1) is verified by the IC card, and the consumed amount will be subtracted from the balance of the e-wallet, and a second Message Authorization code (MAC2) will be generated to enable the Secure Access Module to check its validity and generate a Transaction Certificate (TC) to be verified by a host. After the second Message Authorization code (MAC2) generated by the IC card is successfully verified by the Secure Access Module (PSAM), the transaction will be authorized by the terminal. However, the existing e-wallet system employs a symmetric key system, which has the following deficiencies: 1. the transfer process of the key is complex due to the use of the symmetric keys because the keys are confidential and sensitive data, and thus it requires a secure and reliable mechanism for the transfer process so as to ensure the secure transfer of it, meanwhile, the corresponding management mechanism is also very complex; 2. there are flaws in the security of the secure authentication module: in the symmetric key system, a secure authentication module (such as SAM card) need to be deployed in the terminal in order to verify the validity of an IC card. In reality, however, the terminal users are loosely managed by the card issuers, and thus it is difficult to ensure the security of the use of the secure authentication module (such as SAM card), therefore, there is a potential security risk as follows: an attacker will perform illegal attacks on the secure authentication module, such as the SAM card; 3. it is difficult to update the keys for the following reasons: since the keys used for checking the validity of the IC card are stored in the Secure Access Module (such as SAM card), and thus if a new keys need to be used, the keys in the Secure Access Module (such as SAM card) should be updated, however, generally, the procedure of updating the keys in the Secure Access Module (such as SAM card) is achieved by means of ciphertext plus certification, thereby the procedure is very complex, and thus it is difficult to realize it. Moreover, in terms of transaction functions, the e-wallet system just provides a solution for small amount offline payment, and fails to provide the function for large amount online transaction.

SUMMARY

To overcome the deficiencies in existing solutions as stated above, the present invention proposes a payment system and method of IC card, and a multi-application IC card as well as a payment terminal.

One of the objects of the present invention is realized by the following technical solution:

A payment system of IC card, which includes a host, a terminal, and an IC card, wherein the IC card communicates with the terminal via an interface device, and the terminal connects with the host via a communication interface;

wherein, during a transaction, the terminal and the IC card perform data authentication using an asymmetric key algorithm.

In the solutions disclosed above, preferably, the terminal and the IC card perform off-line data authentication using an asymmetric key algorithm during an off-line transaction.

In the solutions disclosed above, preferably, if the transaction is not approved in manner of off-line, the terminal and the IC card perform an on-line transaction via the host.

In the solutions disclosed above, preferably, the terminal comprises:

an application selection module configured to send an application selection command to the IC card so as to select an application;

an initializing application module configured to control the transaction amount of an off-line payment according to the response returned by the IC card, and determine whether the off-line payment is employed according to a predefined set of conditions;

a terminal behavior analysis module configured to read data from the IC card according to an indication in the response data of the initializing application command sent by the IC card, and compare the difference between an electronic cash balance and an authorized amount with an electronic cash reset threshold so as to determine whether an on-line authorization is initiated, and send a transaction request to the IC card;

a terminal data authentication module configured to perform data authentication using an asymmetric key algorithm during a transaction;

a security checking module configured to perform security check after the terminal data authentication module has completed the data authentication, wherein the security check includes new card check, terminal abnormal file check and merchant compulsory transaction on-line check.

In the solutions disclosed above, preferably, the terminal data authentication module send dynamic application data to the IC card as an input of a hash operation, wherein the dynamic application data includes a signatured data format, a hash algorithm identification, the length of IC card dynamic data, IC card dynamic data, and filling bytes; after receiving the signed data, a public key certificate of card issuer and a public key certificate of IC card sent by the IC card, the terminal data authentication module decrypts the public key certificate of card issuer using a Certificate Authority (CA) public key so as to restore the public key of card issuer; the terminal data authentication module decrypts the public key certificate of IC card using the restored public key of card issuer so as to restore the public key of IC card; the terminal data authentication module decrypts the data signed by the private key of IC card using the restored public key of IC card to obtain the result of the hash operation, and compares it with the result of the hash operation of the plaintext data.

In the solutions disclosed above, preferably, the IC card comprises:

an application selection response module configured to send a response to the terminal after receiving an application selection command sent by the terminal, wherein the response includes a file control information;

an initializing application response module configured to determine whether the transaction is an electronic cash transaction after receiving the initializing application command sent by the terminal, and send response data of the initializing application command to the terminal;

an IC card behavior analysis module configured to determine the type of the transaction according to the transaction request after receiving the transaction request send by the terminal, and perform the transaction according to the result of the determination;

an IC card data authentication module configured to perform data authentication using an asymmetric key algorithm during the transaction.

In the solutions disclosed above, preferably, the IC card data authentication module performs a hash operation on the dynamic application data sent by the terminal; the IC card data authentication module signs the result of the hash operation using the private key of IC card to form signed data; the IC card data authentication module sends the signed data, the public key certificate of card issuer and the public key certificate of IC card to the terminal.

One of the objects of the present invention is realized by the following technical solution:

A multi-application IC card, comprising:

an application selection response module configured to send a response to a terminal after receiving an application selection command sent by the terminal, wherein the response includes a file control information;

an initializing application response module configured to determine whether the transaction is an electronic cash transaction according to a predefined set of conditions after receiving the initializing application command sent by the terminal, and send the response data of the initializing application command to the terminal;

an IC card behavior analysis module configured to determine the type of the transaction according to the transaction request after receiving the transaction request sent by the terminal, and perform the transaction according to the result of the determination;

an IC card data authentication module configured to perform data authentication during the transaction;

wherein the IC card data authentication module perform the data authentication using an asymmetric key algorithm.

In the solutions disclosed above, preferably, the IC card data authentication module performs off-line data authentication using an asymmetric key algorithm during an off-line transaction.

In the solutions disclosed above, preferably, if the transaction is not approved in manner of off-line, the multi-application IC card and the terminal perform an on-line transaction via the host.

In the solutions disclosed above, preferably, the IC card data authentication module performs a hash operation on the dynamic application data sent by the terminal; the IC card data authentication module signs the result of the hash operation using the private key of IC card to form signed data; the IC card data authentication module sends the signed data, the public key certificate of card issuer and the public key certificate of IC card to the terminal.

One of the objects of the present invention is realized by the following technical solution:

A payment terminal, comprising:

an application selection module configured to send an application selection command to an IC card so as to select an application;

an initializing application module configured to control the transaction amount of an off-line payment according to the response returned by the IC card, and determine whether the off-line payment is employed according to a predefined set of conditions;

a terminal behavior analysis module configured to read data from the IC card according to the indication in the response data of the initializing application command sent by the IC card, and compare the difference between an electronic cash balance and an authorized amount with an electronic cash reset threshold so as to determine whether an on-line authorization is initiated, and send a transaction request to the IC card;

a terminal data authentication module configured to perform data authentication during the transaction.

a security checking module configured to perform security check after the terminal data authentication module has completed the data authentication, wherein the security check includes new card check, terminal abnormal file check and merchant compulsory transaction on-line check;

wherein the terminal data authentication module perform the data authentication using an asymmetric key algorithm.

In the solutions disclosed above, preferably, the terminal data authentication module performs off-line data authentication using an asymmetric key algorithm during an off-line transaction.

In the solutions disclosed above, preferably, the payment terminal and the IC card perform an on-line transaction via the host if the transaction is not approved in manner of off-line.

In the solutions disclosed above, preferably, the terminal data authentication module sends dynamic application data to the IC card as the input of a hash operation, wherein the dynamic application data includes a signatured data format, a hash algorithm identification, the length of IC card dynamic data, IC card dynamic data, and filling bytes; after receiving the signed data, a public key certificate of card issuer and a public key certificate of IC card sent by the IC card, the terminal data authentication module decrypts the public key certificate of card issuer using a Certificate Authority (CA) public key so as to restore the public key of card issuer; the terminal data authentication module decrypts the public key certificate of IC card using the restored public key of card issuer so as to restore the public key of IC card; the terminal data authentication module decrypts the data signed by the private key of IC card using the restored public key of IC card to obtain the result of the hash operation, and compares it with the result of the hash operation of the plaintext data.

One of the objects of the present invention is realized by the following technical solution:

An payment method of IC card, comprising:

(A1) a terminal sending an application selection command to an IC card via an interface device;

(A2) in response to the received application selection command, the IC card sending a response including a data object list to the terminal;

(A3) based on the data object list, the terminal building an initializing application command and sending the initializing application command to the IC card, wherein the initializing application command includes initializing parameters;

(A4) according to the initializing parameters, the IC card determining whether the transaction is an electronic cash transaction, and sending the response data of the initializing application command to the terminal;

(A5) the terminal determining whether an online transaction to is initiated according to the response data of the initializing application command, and sending a transaction request to the IC card;

(A6) the IC card determining the type of the transaction according to the transaction request, and performing the transaction according to the result of said determination, wherein data authentication is performed during the transaction;

wherein the payment method of IC card employs an asymmetric key algorithm to perform the data authentication.

In the solutions disclosed above, preferably, the payment method of IC card performing off-line data authentication using an asymmetric key algorithm during an off-line transaction.

In the solutions disclosed above, preferably, the step (A6) further comprising:

the types of transaction include off-line rejection, on-line authorization, and off-line approval, and on-line transaction is performed if it is determined that the type of the transaction is on-line authorization.

In the solutions disclosed above, preferably, the step of data authentication in the step (A6) further comprising:

(c1) the terminal sending dynamic application data to the IC card as the input of a hash operation;

(c2) the IC card performing the hash operation on the dynamic application data, and signing the result of the hash operation using the private key of IC card to form the signed data, and then sending the signed data, the public key certificate of card issuer and the public key certificate of IC card to the terminal;

(c3) the terminal decrypting the public key of card issuer using a Certificate Authority public key so as to restore the public key of card issuer;

(c4) the terminal decrypting the public key certificate of IC card using the restored public key of card issuer so as to restore the public key of IC card;

(c5) the terminal decrypting the data signed by the private key of IC card using the restored public key of IC card to obtain the result of the hash operation, and comparing it with the result of the hash operation of the plaintext data;

wherein the dynamic application data includes a signatured data format, a identification of the hash algorithm, the length of a IC card dynamic data, an IC card dynamic data, and the filling bytes.

The payment system and method of IC card and the multi-application IC card as well as payment terminal disclosed in the present invention have the following advantages: the solutions disclosed in the present invention has a highly secure small amount payment function, and the transfer of the keys is secure and convenient, thereby there is no risk of the security authentication module being attacked, since the data authentication is performed by using an asymmetric key algorithm, and the terminal and the IC card can be connected to the host if the transaction is not approved in manner of off-line; moreover, the payment system and method of IC card and the multi-application IC card as well as payment terminal disclosed by the present invention can be used both in a machinery without on-line transaction environment and in a standard merchant machinery with on-line transaction environment.

BRIEF DESCRIPTION OF THE DRAWINGS

The technical features and advantages of the present invention will be better understood by one skilled in the art in connection with the drawings, in which.

DETAILED DESCRIPTION

Figure 1:
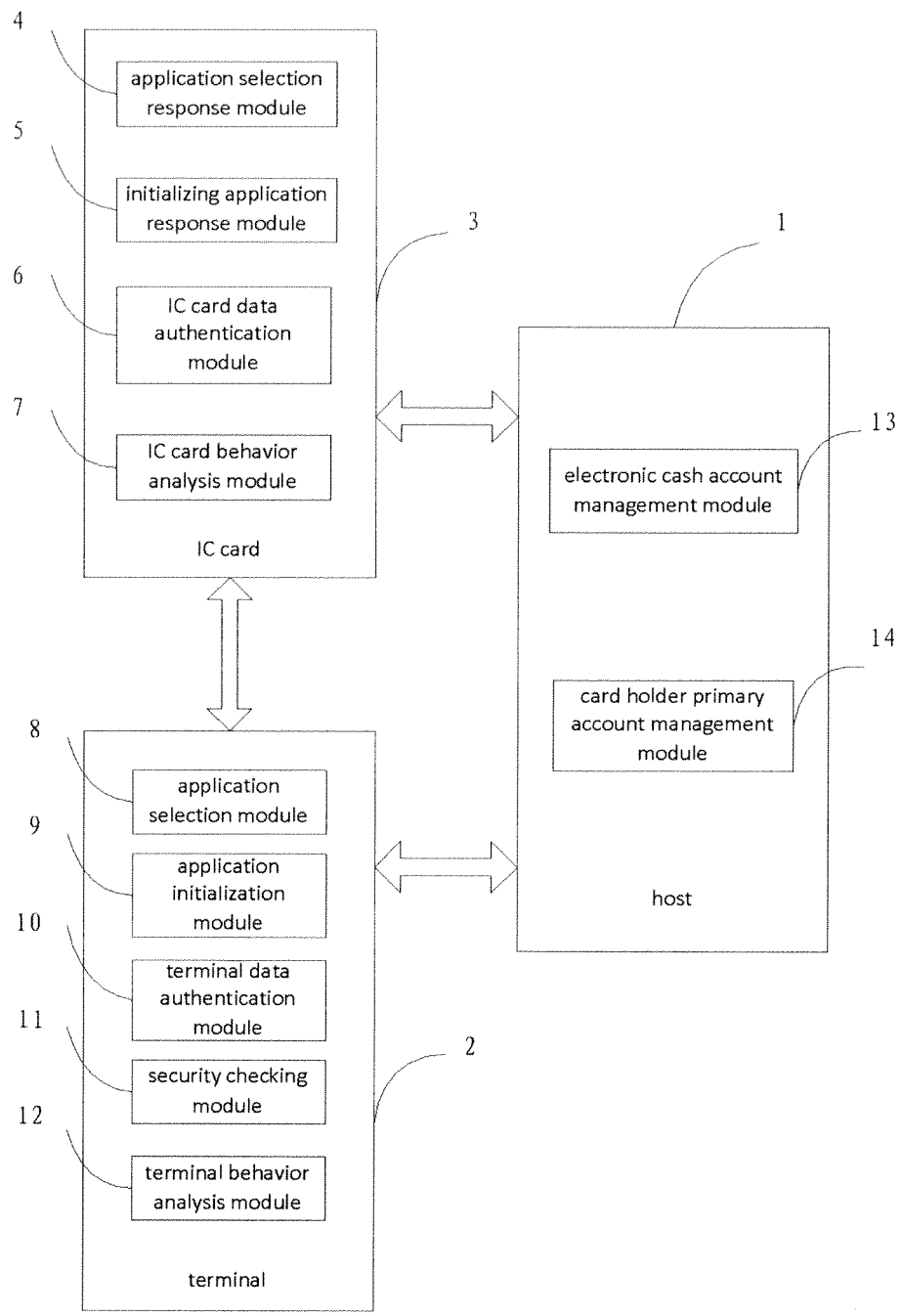
FIG. 1 is the structure view of an payment system of IC card according to the embodiment of the present invention.

FIG. 1 is the structure view of the payment system of IC card according to the embodiment of the present invention. As shown in FIG. 1, the payment system of IC card disclosed in the present invention includes a host 1, a terminal 2, and an IC card 3, wherein the IC card 3 communicates with the host 1 via the terminal 2, the terminal 2 connects with the host 1 via a communication interface, and the terminal 2 and the IC card 3 communicates with each other via an interface device (for example, via a contact). The host 1 includes an electronic cash account management module 13 and a card holder main account management module 14. The electronic cash account management module 13 can be configured to manage the amount of electronic cash which is pre-reserved, to prevent the amount of electronic cash from being used for non-electronic cash payment and to perform clearing for the off-line transactions of the IC card. The card holder main account management module 14 can be configured to manage the current account that is on-line authorized, such as to authorize and clear on-line transactions or to transfer cash for the electronic cash account.

As shown in FIG. 1, the terminal 2 includes an application selection module 8, an initializing application module 9, a terminal data authentication module 10, a security checking module 11, and a terminal behavior analysis module 12, wherein the application selection module 8 sends an application selection command (such as SELECT) to the IC card 3 such that an application can be selected.

According to the response (such as the File Control Information (FCI)) returned by the IC card, the initializing application module 9 controls the transaction amount which can be paid in manner of off-line, and determines whether off-line payment is employed according to decision conditions such as transaction currency code, the last transaction behavior, etc., such that the risk of off-line payment can be minimized. For example, when the following conditions are met, the terminal 2 determines that off-line payment can be applied: (1) electronic cash transactions are supported by the terminal 2; (2) the authorized amount is less than the amount limit for electronic cash terminal transactions, or less than the minimum amount limit of the terminal if the terminal 2 does not include a separate amount limit for electronic cash terminal transactions; (3) the type of the transaction at the terminal is consumption transaction. When the terminal 2 determines that off-line payment can be applied, it will provide an electronic cash terminal support indicator (i.e. the value of the indicator is set as 1) in the initializing command, e.g. GPO command, i.e. command of GET PROCESSING OPTIONS.

When the response data of the initializing application command sent by the IC card 3 is received, the terminal behavior analysis module 12 reads data, such as the electronic cash balance and the electronic cash reset threshold, from the IC card 3 according to the indication in the response data of the initializing application command (for example, the position of data objects (such as electronic cash specific data, e.g. authorization code of the electronic cash card issuer) in the IC card 3 is indicated by the application file position AFL), and compares the difference between the electronic cash balance and the authorized amount with the electronic cash reset threshold, meanwhile, the terminal behavior analysis module 12 performs the following terminal behavior analysis in connection with the capability of the terminal. (1) If the electronic cash balance subtracted by the authorized amount is larger than or equal to the electronic cash reset threshold, an request for off-line approval will be sent to the IC card such that the electronic cash transaction is performed; (2) If the electronic cash balance subtracted by the authorized amount is less than the electronic cash reset threshold, the terminal behavior analysis module 12 will make the following determination according to the capability of the terminal 2: (a) if the terminal 2 has the capability of online connection, it will require connection and ask the card holder to enter his online personal identification number (PIN), such that the request for this transaction may be authorized by the card issuer in manner of on-line, and at the same time the electronic balance will be updated; (b) if the terminal 2 has no capability of online connection, it will request for off-line approval, such that this transaction can be completed in manner of off-line or be refused in manner of off-line; (c) if the terminal fails in establishing the on-line connection, the terminal 2 and the IC card will perform a standard debit/credit transaction.

During the terminal behavior analysis of the terminal behavior analysis module 12, the terminal data authentication module 10 employs an asymmetric key algorithm to perform data authentication, that is, the terminal 2 sends dynamic application data into the IC card 3 as the input of a hash operation, wherein the dynamic application data includes a signatured data format, a hash algorithm identification, the length of an IC card dynamic data, an IC card dynamic data, filling bytes, etc. Thereafter, after receiving the signed data, the public key certificate of card issuer and the public key certificate of IC card sent by the IC card 3, the terminal data authentication module 10 decrypts the public key certificate of card issuer using the Certificate Authority (CA) public key so as to restore the public key of card issuer. The terminal data authentication module 10 then decrypts the public key certificate of IC card using the restored public key of card issuer so as to restore the public key of IC card. The terminal data authentication module 10 decrypts the data signed by the private key of IC card using the restored public key of IC card to obtain the result of the hash operation, and compares it with the result of the hash operation of the plaintext data, so as to determine the validity of the IC card 3, wherein when a card issuer personalize an IC card, the card issuer will write the public key certificate of card issuer, which is generated by the Certificate Authority (CA) by means of digitally signing the public key of card issuer with the CA private key, and the public key certificate of IC card, which is generated by the card issuer by means of digitally signing the public key of IC card with the private key of card issuer, into the IC card 3, and the Certificate Authority (CA) public key is downloaded into the terminal 2. Wherein, the private key refers to a key in a pair of asymmetric keys used by one entity that can only be used by the entity. In the approach of digitally signaturing, a private key defines the signing function. The public key refers to a key in a pair of asymmetric keys used by one entity that can be used by the public. In the approach of digitally signaturing, a public key defines the verifying function. The asymmetric key algorithm employs an encrypting technology related to the following transforms: the public transform, which is defined by the public key, and the private transform, which is defined by the private key. Both transforms above mentioned have the following characteristics: the private transform can not be derived by means of calculating when only the public transform is available. As can be seen from the above, the asymmetric key algorithm is characterized in that it is convenient to transfer and update the keys and it does not require a high security level for the terminals. Therefore, the use of asymmetric key algorithm can effectively prevent the generation of fake card transactions, thereby the security of IC card transactions is improved.

After the terminal data authentication module 10 has completed the data authentication, the security checking module 11 performs security check to complete risk management. For example, the security checking module 11 can perform the following checks: (1) new card check, wherein if there are continuous off-line upper limit and continuous off-line lower limit, the security checking module 11 will check the last on-line transaction sequence number register (the last on-line transaction sequence number register will be reset after the transaction is approved in manner of on-line according to the authentication result of card issuer and the parameters of IC card), and if the last on-line transaction sequence number is 0, the security checking module 11 will set the "new card" position in the terminal verification result (TVR) as 1; (2) terminal abnormal file check, wherein if there is any terminal abnormal file, the security checking module 11 will check whether the primary account number (PAN) on the IC card 3 is listed in the terminal abnormal file, and if the account number is listed in the terminal abnormal file, then the security checking module 11 will set the "card number appearing in terminal abnormal file" position in the terminal verification result (TVR) as 1; (3) merchant compulsory transaction online check, wherein at a terminal 2 with the capability of online connection, the merchant can set the terminal 2 as "the transaction shall be processed in manner of on-line", and if it is checked that the merchant compel the transaction to be processed in manner of on-line, then the security checking module 11 will set the "merchant compelling the transaction to be processed in manner of on-line" position in the terminal verification result (TVR) as 1.

As shown in FIG. 1, the IC card 1 includes an application selection response module 4, an initializing application response module 5, an IC card data authentication module 6, and an IC card behavior analysis module 7. After receiving a selection command sent by the terminal 2, the application selection response module 4 will send a response, such as the file control information (FCI), to the terminal, wherein the response includes a data object list (e.g. a data object list (PDOL) for requesting electronic cash terminal support indicator, the authorized amount, the transaction currency code, etc.) requested by the IC card 3 from the terminal 2.

After receiving the initializing application command (such as command of GET PROCESSING OPTIONS, i.e. GPO command) sent from the terminal 2, the initializing application response module 5 determines whether this transaction is an electronic cash transaction according to decision conditions, wherein a set of conditions can be determined based on particular requirements. For example, the IC card 3 will determine that this transaction is an electronic cash transaction when the following conditions are met (that is, this transaction is not electronic cash transaction when any condition of the following set of conditions is not met): (1) an electronic cash terminal support indicator, value of which is set as 1, is included in the initializing application command; (2) the transaction currency code matchs the application currency code; (3) the authorized amount is not beyond the electronic cash balance; (4) the authorized amount is not beyond the electronic cash limit of a single transaction; (5) the value of the indicator for the to failure of the authentication of the card issuer is 0; (6) the value of the indicator for the failure of processing of the script of the card issuer in the last on-line transaction is 0; (7) The number of attempts of the personal identification number is not 0. If the current transaction is an electronic cash transaction, then the IC card 3 identifies the current transaction as an electronic cash transaction, and sends response data of the initializing application command to the terminal 2. For example, the response data includes application interaction property (AIP) and application file location (AFL) data of the electronic cash, wherein the application interaction property (AFL) indicates the functions supported by electronic cash transactions, and the application file location (AFL) indicates the location of electronic cash specific data, for example, the authorization code of the electronic cash card issuer. If the current transaction is not an electronic cash transaction, then the IC card returns the application interaction property (AIP) and application file location (AFL) of non-electronic cash in the response data of initializing application command, that is, no authorization code of the electronic cash card issuer is returned, such that the terminal 2 will treat the current transaction as an ordinary debit/credit transaction.

After receiving the request of the terminal 2, for example, the transaction ciphertext generation command (for example, GENERATE AC), the IC card behavior analysis module 7 will perform off-line rejection, on-line authorization, or off-line approval of a transaction according to the request. If off-line approval of transactions is required to be performed, the IC card behavior analysis module 7 will update the electronic cash balance and the related counter in the IC card 3 according to the amount of the transaction, in order to ensure that the IC card 3 can precisely reflect the amount limit which can be authorized by the card holder in manner of off-line. If the initializing application response module 5 has determined that the current transaction is an electronic cash transaction, the IC card behavior analysis module 7 will perform the following functions: (1) if the terminal 2 rejects the transaction in manner of off-line(for example, the type of the requested ciphertext is an application authentication ciphertext (AAC)), the IC card behavior analysis module 7 will return the application authentication ciphertext (AAC) in the response to the transaction ciphertext generation command (for example, GENERATE AC). (2) subsequently, the IC card behavior analysis module 7 will perform risk check of the IC card, for example, the check of skipping the uncompleted on-line authorization, the check of the card issuer authentication failure of the last transaction, the check of the card issuer script processing of the last on-line transaction, the check of new card, and the check of the number of attempts of off-line personal identification number (PIN) and a various of frequency check, the check of static data authentication (SDA) failure of the last transaction and the check of the dynamic data authentication (DDA) failure of the last transaction, etc.; (3) if the terminal 2 requests for an on-line trans-action, the IC card behavior analysis module 7 will return an on-line authorization request (for example, an authorization request ciphertext (ARQC)) in the response to the transaction ciphertext generation command (for example, GENERATE AC); (4) if the terminal 2 requests for a off-line approval, the IC card behavior analysis module 7 will subtract the authorized amount from the electronic cash balance, and return the updated electronic cash balance in the issuer-defined data (IDD) of the issuer's application data. Since the balance is an important data in a transaction, the terminal 2 needs to ensure the authenticity of the balance sent to the host 1. A method of checking the balance is as follows: the IC card behavior analysis module 7 generates the balance and calculates the balance check code; next, the IC card behavior analysis module 7 sends both the balance and the balance check code to the terminal 2, which will upload the balance and the balance check code to the host 1, and the host 1 will verify the authenticity of the balance uploaded by the terminal 2 according to the balance check code, thereby the security of the transaction is ensured.

During the IC card behavior analysis process of the IC card behavior analysis module 7, the IC card data authentication module 6 performs a hash operation on the dynamic application data sent by the terminal 2, and then signs the result of the hash operation using an the private key of IC card that is securely stored to form the signed data. Then, the IC card data authentication module 6 sends the signed data, the public key certificate of card issuer and the public key certificate of IC card to the terminal 2.

As shown in FIG. 1, during the off-line transaction, the IC card 3 performs the following actions to determine whether or not the transaction can be authorized in manner of off-line: The IC card 3 compares the current authorized amount to the electronic cash balance, and requests for on-line authorization if the currently authorized amount exceeds the electronic cash balance of the IC card 3; if the transaction is approved in manner of off-line, the IC card 3 subtracts the authorized amount of the current transaction from the electronic cash balance; if the IC card 3 requests for on-line authorization, but the terminal has no capability of online connection, a standard credit/debit transaction processing can be performed or the transaction can be immediately terminated. After the transaction is completed, the terminal 2 typically sends the collected transaction data to the host 1 in a determined time, such that subsequent clearing can be performed. When the host 1 receives the transaction data for clearing, it identifies whether the transaction is completed by means of an electronic cash transition, and if so, the electronic cash account management module 13 subtracts corresponding transaction amount from the electronic cash account, rather than the primary account of the card holder. In the clearing operation, the electronic cash account management module 13 in the host 1 can perform the following checks: checking the application transaction counter (ACT) received, such that it knows whether there are uncompleted transactions to be submitted to clear.

As shown in FIG. 1, during the online transaction, the card holder's main account management module 14 in the host 1 may perform the following actions on the electronic cash account: (1) checking whether the IC card is reported lost; (2) performing an online card authentication (CAM) by verifying the authentication request ciphertext (ARQC) sent in the online message; (3) checking the data content of the chip to discover the reason why the transaction is transmitted for online processing. Usually, the transaction requires to be processed in manner of on-line for the following reasons: (1) the difference between the electronic cash balance and the authorized amount is less than an electronic cash reset threshold; (2) abnormal occurs during the transaction, such that the transaction is forced to be performed in manner of online (for example, the card holder fails to entry the right off-line personal identification number). The host 1 can perform predefined additional processing for the online transaction. For example, when the transaction is transmitted for online processing as the authorized amount is greater than the electronic cash balance of the card, the card holder's main account management module 14 in the host 1 can perform the following predefined actions: (1) checking the balance of primary account, and if the balance is sufficient, the transaction is approved and the authorized approval is sent back to the IC card 3, and payout operation is performed in the primary account, while the electronic cash balance in the IC card 3 remains unchanged; or (2) performing automatic credit for load of the electronic cash account of the IC card 3.

Figure 2:
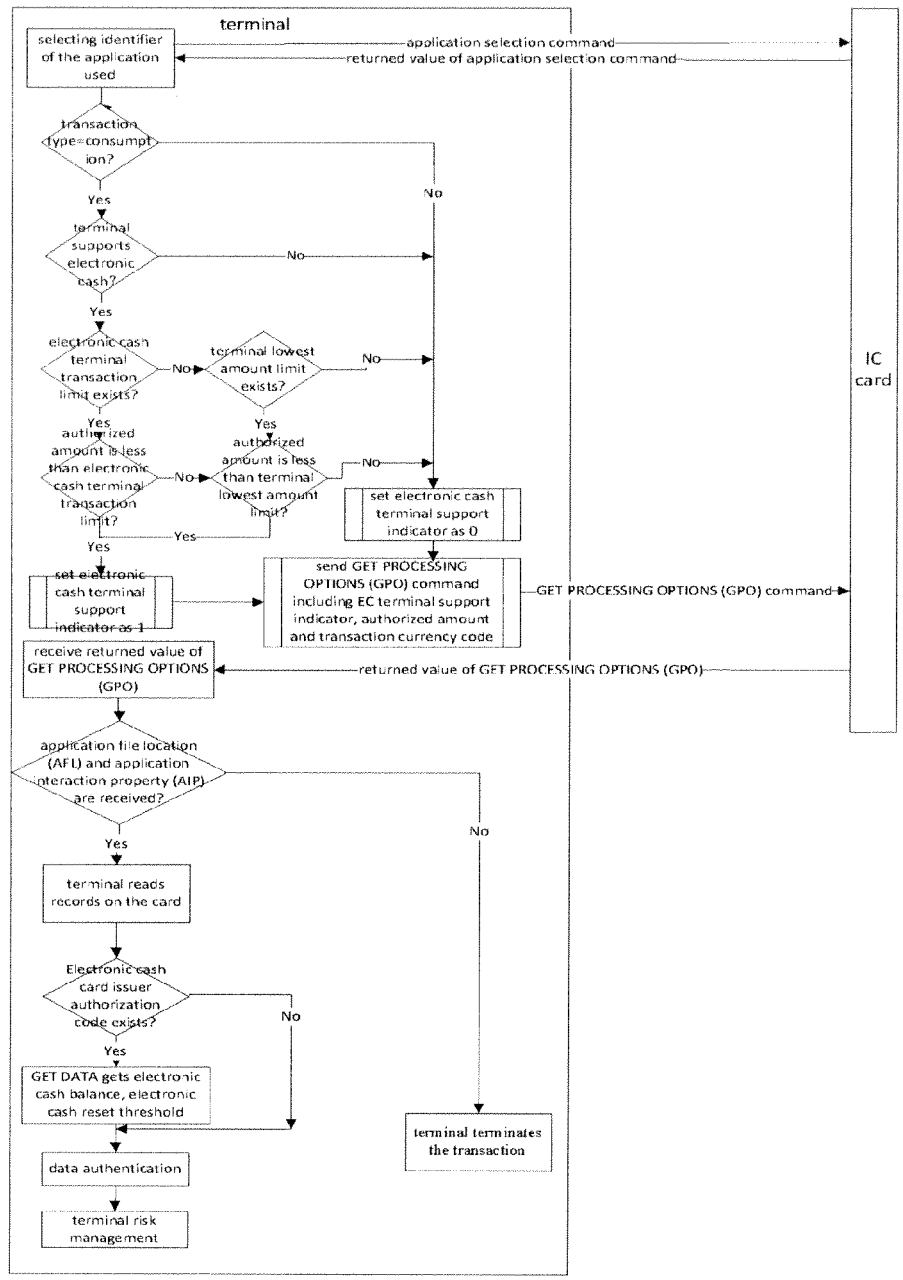
FIG. 2 is the payment flow chart at the terminal side of the payment method of IC card according to the embodiment of the present invention.
Figure 3:
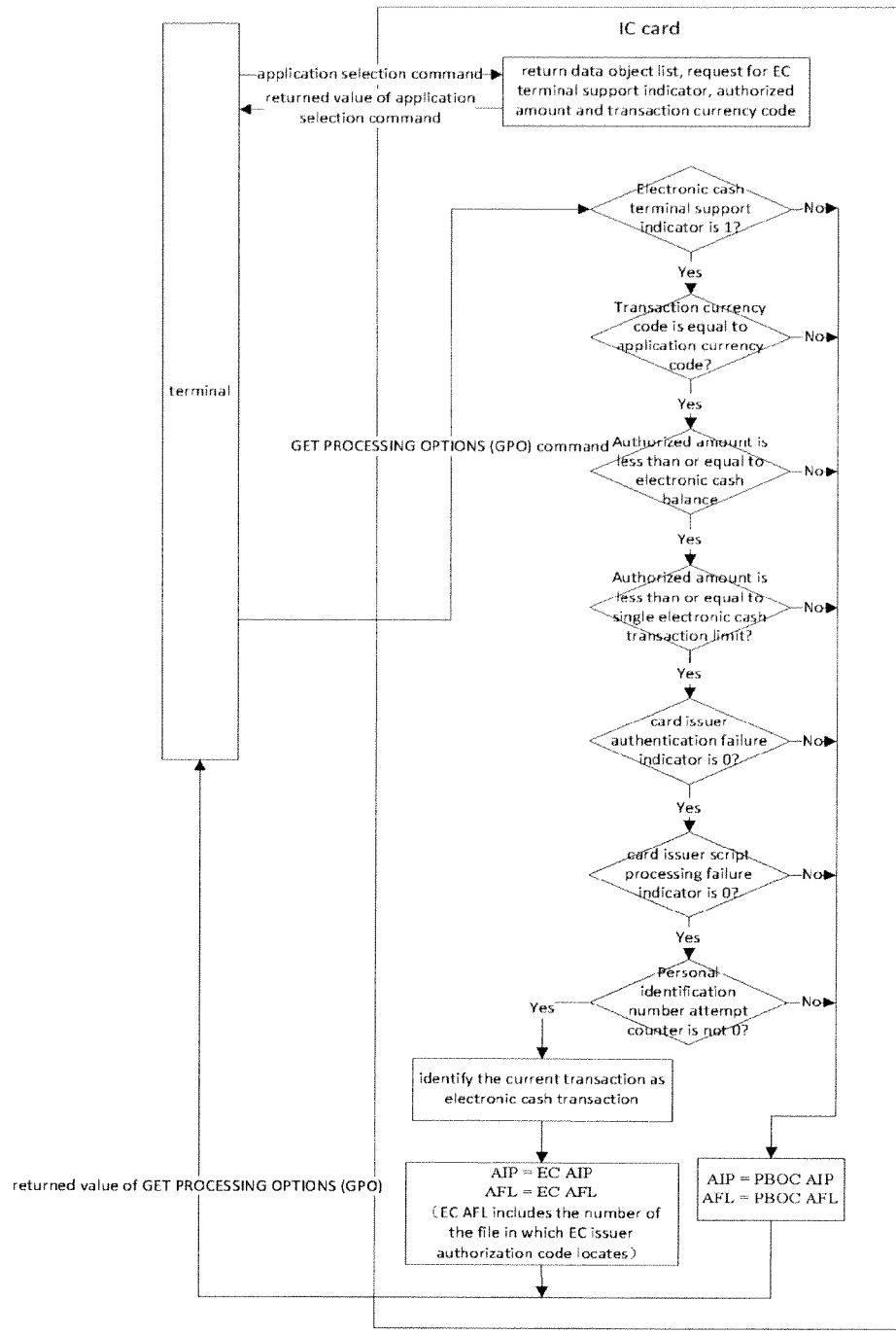
FIG. 3 is the payment flow chart at the IC card side of the payment method of IC card according to the embodiment of the present invention.
Figure 4:
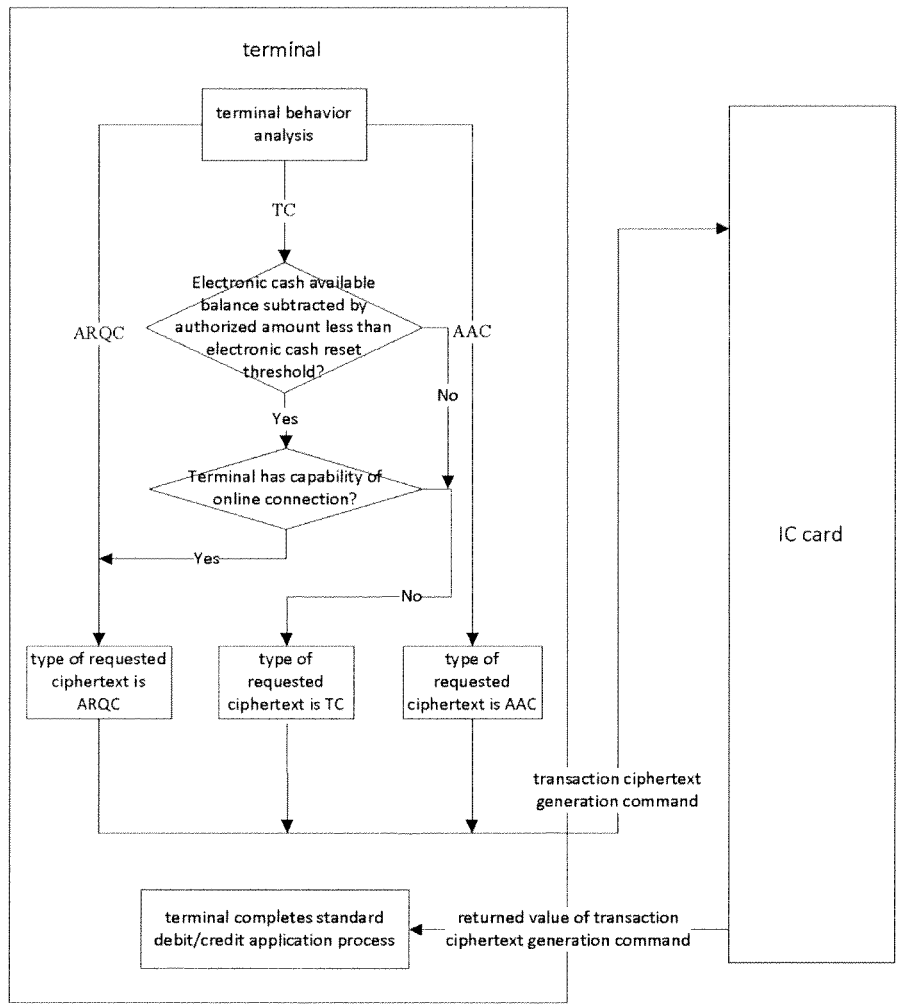
FIG. 4 is the behavior analysis flow chart at the terminal side of the payment method of IC card according to the embodiment of the present invention.
Figure 5:
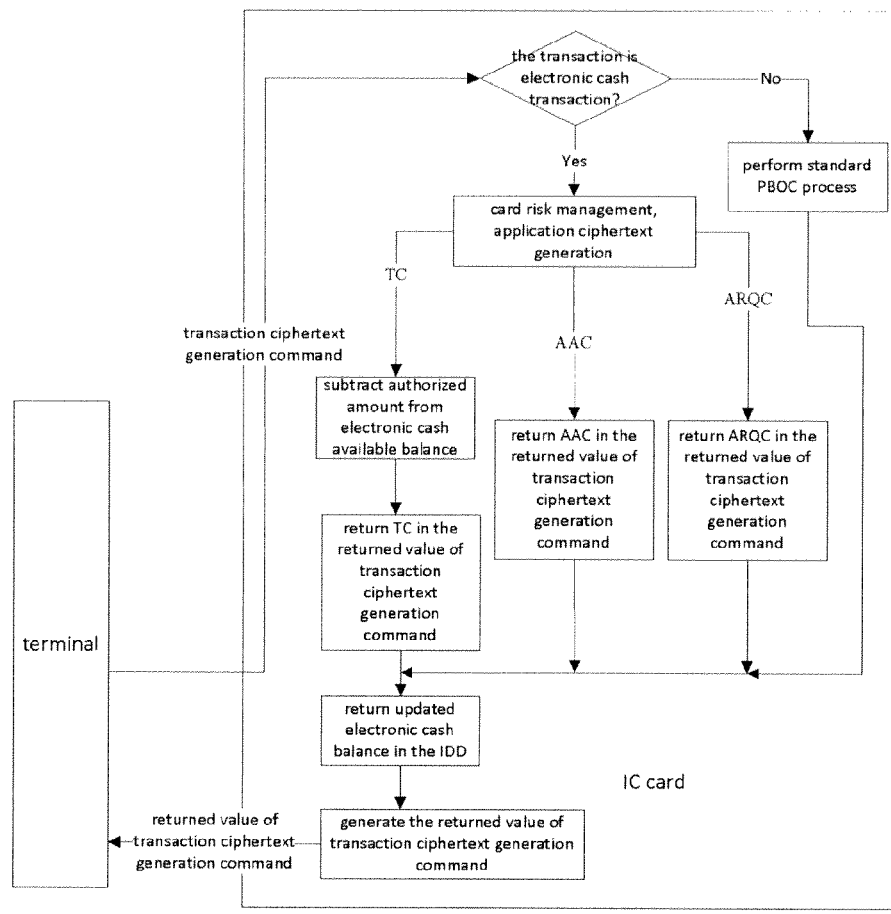
FIG. 5 is the behavior analysis flow chart at the IC card side of the payment method of IC card according to the embodiment of the present invention.

FIG. 2 is the payment flow chart at the terminal side of the payment method of IC card according to the embodiment of the present invention. FIG. 3 is the payment flow chart at the IC card side of the payment method of IC card according to the embodiment of the present invention. FIG. 4 is the behavior analysis flow chart at the terminal side of the payment method of IC card according to the embodiment of the present invention. FIG. 5 is the behavior analysis flow chart at the IC card side of the payment method of IC card according to the embodiment of the present invention. As shown in FIGS. 2-5, the payment method of IC card disclosed in the present invention comprises the following steps: (A1) a terminal sends an application selection command to the IC card via an interface device; (A2) in response to the received application selection command, the IC card sends a response including a data object list to the terminal; (A3) based on the data object list, the terminal builds an initializing application command and sends the initializing application command to the IC card, wherein the initializing application command includes initializing parameters; (A4) according to the initializing parameters, the IC card determines whether the current transaction is an electronic cash transaction, and sends the response data of the initializing application command to the terminal; (A5) the terminal determines whether to initiate an online authentication according to the response data of the initializing application command and sends a transaction request to the IC card; (A6) the IC card determines the type of the transaction according to the transaction request and performs the transaction according to the result of said determination, wherein data authentication is performed during the transaction. The method employs an asymmetric key algorithm to perform the data authentication.

As shown in FIGS. 2-5, step A6, further includes: the type of the transaction includes off-line rejection, on-line authorization and off-line approval.

As shown in FIGS. 2-5, step A3, further includes: if the terminal 2 determines that off-line payment approach can be employed, the terminal 2 provides an electronic cash terminal support indicator (i.e. the value of the indicator is set as 1) in the initializing command, e.g. GPO command, i.e. command of GET PROCESSING OPTIONS, and wherein If the following conditions are met, the terminal can determine that off-line payment approach can be employed: the terminal supports electronic cash transactions; the authorized amount is less than the transaction amount limit of the electronic cash terminal, or less than the minimum limit of the terminal in case of the terminal not including a separate electronic cash terminal transaction amount limit; the type of the transaction is consumption transaction.

As shown in FIGS. 2-5, step A5, further includes: the terminal compare the difference between the electronic cash balance and the authorized amount with the electronic cash reset threshold, and perform the following terminal behavior analysis in connection with the capability of the terminal: (a1) If the electronic cash balance subtracted by the authorized amount is larger than or equal to the electronic cash reset threshold, an off-line approval will be requested from the IC card such that the electronic cash transaction is performed; (a2) if the electronic cash balance subtracted by the authorized amount is less than the electronic cash reset threshold, the terminal makes the following determination according to the capability of the terminal: (I) the terminal request an online transaction if the terminal have the capability of online connection; (II) the terminal requests for an off-line approval if the terminal have no capability of online connection; (III) the terminal and the IC card performing a standard debit/credit transaction if the terminal fails in establishing the online connection.

As shown in FIGS. 2-5, step A6, further includes: If it is determined that the current transaction is an electronic cash transaction, the IC card performs the following steps: (b1) if the terminal rejects off-line transaction, the IC card returns the application authentication ciphertext (AAC) in the response to the transaction ciphertext generation command; (b2) if the terminal requests for an online transaction, the IC card returns an online authorization request in the response to the transaction ciphertext generation command; (b3) if the terminal requests for an off-line approval, the IC card subtracts the authorized amount from the electronic cash balance, and returns the updated electronic cash balance in the issuer-defined data (IDD) of the issuer's application data.

As shown in FIGS. 2-5, the data authentication step of step A6, further includes: (c1) the terminal sends dynamic application data to the IC card as the input of a hash operation; (c2) the IC card performs the hash operation on the dynamic application data, and signs the result of the hash operation using private key of the IC card to form the signed data, and then sends the signed data, the public key certificate of card issuer and the public key certificate of IC card to the terminal; (c3) the terminal decrypts the public key certificate of card issuer using a Certificate Authority public key so as to restore the public key of card issuer; (c4) the terminal decrypts the public key certificate of IC card using the restored public key of card issuer so as to restore the public key of IC card; (c5) the terminal decrypts the data signed by the private key of IC card using the restored public key of IC card to obtain the result of the hash operation, and compares it with the result of the hash operation of the plaintext data. The dynamic application data includes a signatured data format, the identification of the hash algorithm, the length of the IC card dynamic data, an IC card dynamic data, and the filling bytes.

As shown in FIGS. 2-5, the payment method of IC card disclosed in the present invention further comprises the following steps: after the data authentication is completed, the terminal performs the following security checks: (d1) new card check, wherein if a continuous off-line upper limit and a continuous off-line lower limit exist, the terminal check the register of the last online transaction sequence number, and if the last on-line transaction sequence number is 0, the terminal sets the "new card" position in the terminal verification result (TVR) as 1; (d2) terminal abnormal file check, wherein If there is any terminal abnormal file, the terminal checks whether the primary account number (PAN) on the IC card is listed in the terminal abnormal file, and if the account number is listed in the terminal abnormal file, the terminal sets the "card number appearing in terminal abnormal file" position in the terminal verification result (TVR) as 1; (d3) merchant compulsory transaction on-line check, wherein if it is checked that the merchant compels the transaction to be processed in manner of on-line, then the terminal sets the "merchant compelling the transaction to be processed in manner of on-line" position in the terminal verification result (TVR) as 1.

Although the present invention has been described in terms of the above preferred embodiments, the implements thereof are not limited to the above embodiments. It should be appreciated that various changes and modifications can be made to the present invention by the skilled in the art without departing from the spirit and scope of the present invention.

The invention claimed is:

1. An payment system of IC card, which includes a host, a terminal, and an IC card, wherein the IC card communicates with the terminal via an interface device, and the terminal connects with the host via a communication interface;
   wherein during a transaction, the terminal and the IC card performs data authentication using an asymmetric key algorithm; and further wherein
   the terminal includes a terminal data authentication module to send dynamic application data that includes a signatured data format, an identification of a hash algorithm, and IC card dynamic data to the IC card as an input of a hash operation; to receive signed data, a public key certificate of a card issuer, and a public key certificate of the IC card from the IC card; to decrypt, using a Certificate Authority (CA) public key, the public key certificate of the card issuer so that the public key of the card issuer is restored; to decrypt the public key certificate of the IC card using the restored public key of the card issuer so that the public key of the IC card is restored; to decrypt the data signed by a private key of the IC card using the restored public key of the IC card to obtain decrypted signed data of the hash operation; and to compare the decrypted signed data with a result of the hash operation of plaintext data.

2. The payment system of IC card of claim 1, wherein during an off-line transaction, the terminal and the IC card performs off-line data authentication using the asymmetric key algorithm.

3. The payment system of IC card of any of claims 1-2, wherein the terminal and the IC card perform an on-line transaction via the host if the transaction is not approved in manner of off-line.

4. The payment system of IC card of any of claims 1-2, wherein the terminal includes:
   an application selection module configured to send an application selection command to the IC card so as to select an application;
   an initializing application module configured to control the transaction amount of an off-line payment according to the response returned by the IC card, and determine whether the off-line payment is employed according to a predefined set of conditions;
   a terminal behavior analysis module configured to read data from the IC card according to an indication in the response data of the initializing application command sent by the IC card, and compare the difference between an electronic cash balance and an authorized amount with an electronic cash reset threshold to determine whether an on-line authorization is initiated, and send a transaction request to the IC card;
   the terminal data authentication module configured to perform data authentication using the asymmetric key algorithm during the transaction;
   a security checking module configured to perform security checks after the terminal data authentication module has completed the data authentication, wherein the security checks include new card check, terminal abnormal file check and merchant compulsory transaction on-line check.

5. The payment system of IC card of any of claims 1-2, wherein the IC card includes:
   an application selection response module configured to send a response to the terminal after receiving the application selection command sent by the terminal, wherein the response includes file control information;
   an initializing application response module configured to determine whether the current transaction is an electronic cash transaction according to a predefined set of conditions after receiving the initializing application command sent by the terminal, and send the response data of the initializing application command to the terminal;
   an IC card behavior analysis module configured to determine the type of the transaction according to the transaction request after receiving the transaction request of the terminal and perform the transaction according to the result of the determination;
   an IC card data authentication module configured to perform data authentication using an asymmetric key algorithm during the transaction.

6. The payment system of IC card of the claim 5,
   wherein, the IC card data authentication module performs a hash operation on the dynamic application data sent by the terminal and the IC card dynamic data related to the current transaction; the IC card data authentication module signs the result of the hash operation using the private key of IC card to form the signed data; the IC card data authentication module sends the signed data, the public key certificate of card issuer and the public key certificate of IC card to the terminal.

7. The payment system of claim 1, wherein the dynamic application data further includes the length of IC card dynamic data and filling bytes.

8. A multi-application IC card which comprises:
   an application selection response module configured to send a response to a terminal after receiving an application selection command sent by the terminal, wherein the response includes file control information;
   an initializing application response module configured to determine whether the current transaction is an electronic cash transaction according to a predefined set of conditions after receiving the initializing application command sent by the terminal, and send the response data of the initializing application command to the terminal;
   an IC card behavior analysis module configured to determine the type of the transaction according to the transaction request after receiving the transaction request of the terminal and perform the transaction according to the result of the determination;
   an IC card data authentication module configured to perform data authentication during the transaction, to perform a hash operation on dynamic application data received from the terminal that includes a signatured data format, an identification of a hash algorithm, and IC card dynamic data, to sign a result of the hash operation on the dynamic application data using a private key of the IC card to form signed data, and to send the signed data, a public key of a card issuer, and a public key certificate of the IC card to the terminal;

wherein the IC card data authentication module performs the data authentication using an asymmetric key algorithm.

9. The multi-application IC card of claim 8, wherein during an off-line transaction, the IC card data authentication module performs off-line data authentication using the asymmetric key algorithm.

10. The multi-application IC card of any of claims 8-9, wherein the multi-application IC card and the terminal perform an on-line transaction via a host if the transaction is not approved in manner of off-line.

11. The multi-application IC card of claim 8, wherein the dynamic application data further includes the length of IC card dynamic data and filling bytes.

12. A payment terminal, comprising:
an application selection module configured to send an application selection command to an IC card so as to select an application; an initializing application module configured to control the transaction amount of an off-line payment according to the response returned by the IC card, and determine whether the off-line payment is employed according to a predefined set of conditions;
a terminal behavior analysis module configured to read data from the IC card according to an indication in the response data of the initializing application command sent by the IC card, and compare the difference between an electronic cash balance and an authorized amount with an electronic cash reset threshold to determine whether an on-line authorization is initiated, and send a transaction request to the IC card;
a terminal data authentication module configured to (i) perform data authentication during the transaction, (ii) to send dynamic application data that includes a signatured data format, an identification of a hash algorithm, and IC card dynamic data to the IC card as an input of a hash operation, (iii) to receive signed data, a public key certificate of a card issuer, and a public key certificate of the IC card from the IC card, (iv) to decrypt, using a Certificate Authority (CA) public key, the public key certificate of the card issuer so that the public key of the card issuer is restored, (v) to decrypt the public key certificate of the IC card using the restored public key of the card issuer to restore the public key of the IC card, (vi) to decrypt the data signed b a private key of the IC card using the restored public key of the IC card to obtain decrypted signed data of the hash operation, and (vii) to compare the decrypted signed data with a result of the hash operation of plaintext data; and
a security checking module configured to perform security checks after the terminal data authentication module has completed the data authentication, wherein the security checks include new card check, terminal abnormal file check and merchant compulsory transaction on-line check;
wherein the terminal data authentication module performs the data authentication using an asymmetric key algorithm.

13. The payment terminal of claim 12, wherein during an off-line transaction, the terminal data authentication module performs off-line data authentication using the asymmetric key algorithm.

14. The payment terminal of any of claims 12-13, wherein the payment terminal and the IC card perform an on-line transaction via a host if the transaction is not approved in manner of off-line.

15. The payment terminal of claim 12, wherein the dynamic application data further includes a length of the IC card dynamic data and filling bytes.

16. A payment method of IC card, comprising the following steps:
(A1) a terminal sending an application selection command to an IC card via an interface device;
(A2) in response to the received application selection command, the IC card sending a response including a data object list to the terminal;
(A3) based on the data object list, the terminal building an initializing application command and sending the initializing application command to the IC card, wherein the initializing application command includes initializing parameters;
(A4) according to the initializing parameters, the IC card determining whether the current transaction is an electronic cash transaction, and sending a response data of the initializing application command to the terminal;
(A5) the terminal determining whether an online transaction is initiated according to the response data of the initializing application command and sending a transaction request to the IC card;
(A6) the IC card determining the type of the transaction according to the transaction request and performing the transaction according to the result of said is determination, wherein the data authentication is performed during the transaction and includes the following operations,
(c1) the terminal sending dynamic application data that includes a signatured data format, an identification of a hash algorithm, and IC card dynamic data to the IC card as an input of a hash operation;
(c2) the IC card performing the hash operation on the dynamic application data signing a result of the hash operation using a private key of the IC card to form signed data, and sending the signed data, a public key certificate of a card issuer, and a public key certificate of the IC card to the terminal;
(c3) the terminal decrypting the public key certificate of the card issuer using a Certificate Authority public key to restore the public key of the card issuer;
(c4) the terminal decrypting the public key certificate of the IC card using the restored public key of the card issuer to restore the public key of the IC card; and
(c5) the terminal decrypting the data signed by the private key of the IC card using the restored public key of the IC card to obtain decrypted signed data of the hash operation and comparing the decrypted signed data with a result of the hash operation of plaintext data; and
wherein the payment method of IC card employs an asymmetric key algorithm to perform the data authentication.

17. The payment method of IC card of claim 16, wherein during an off-line transaction, the payment method of IC card performs the off-line data authentication using the asymmetric key algorithm.

18. The payment method of IC card of any of claims 16-17, wherein the step A6 further comprises: the transaction types including off-line rejection, on-line authorization, and
off-line approval, and an on-line transaction is performed if it is determined that the type of the transaction is on-line authorization.

19. The payment method of claim 16, wherein the dynamic application data further includes a length of the IC card dynamic data and filling bytes.

* * * * *

UNITED STATES PATENT AND TRADEMARK OFFICE
CERTIFICATE OF CORRECTION

| | | |
|---|---|---|
| PATENT NO. | : 8,608,064 B2 | Page 1 of 1 |
| APPLICATION NO. | : 13/511997 | |
| DATED | : December 17, 2013 | |
| INVENTOR(S) | : Jinyao Xu et al. | |

It is certified that error appears in the above-identified patent and that said Letters Patent is hereby corrected as shown below:

On the Title Page, in Item [75] under Inventors, line 5, please delete "Denfeng" and insert --Dengfeng--.

In the Claims

Column 15, Claim 12, line 46, please delete "b" and insert --by--.

Column 16, Claim 16, line 35, please delete "data signing" and insert --data, signing--.

Signed and Sealed this
Seventeenth Day of June, 2014

Michelle K. Lee
*Deputy Director of the United States Patent and Trademark Office*